United States Patent
Adams et al.

(10) Patent No.: US 10,777,782 B2
(45) Date of Patent: Sep. 15, 2020

(54) THIN ELECTROCHEMICAL CELL

(75) Inventors: Paul Barrie Adams, Aldershot (GB); Fazlil Ahmode Coowar, Southampton (GB); Gary Owen Mepsted, Southampton (GB); Christopher Douglas James Spooner, Bracknell (GB); Girts Vitins, Gosport (GB)

(73) Assignee: QinetiQ Limited, Hampshire (GB)

( * ) Notice: Subject to any disclaimer, the term of this patent is extended or adjusted under 35 U.S.C. 154(b) by 199 days.

(21) Appl. No.: 13/575,869

(22) PCT Filed: Jan. 21, 2011

(86) PCT No.: PCT/GB2011/000067
§ 371 (c)(1),
(2), (4) Date: Jul. 27, 2012

(87) PCT Pub. No.: WO2011/095758
PCT Pub. Date: Aug. 11, 2011

(65) Prior Publication Data
US 2013/0029205 A1 Jan. 31, 2013

(30) Foreign Application Priority Data
Feb. 8, 2010 (GB) .................................. 1001992.5

(51) Int. Cl.
*H01M 2/02* (2006.01)
*H01M 4/70* (2006.01)
(Continued)

(52) U.S. Cl.
CPC ........... *H01M 2/0272* (2013.01); *B32B 27/08* (2013.01); *H01G 4/228* (2013.01); *H01G 9/02* (2013.01);
(Continued)

(58) Field of Classification Search
CPC ........... H01M 10/0436; H01M 10/044; H01M 10/0486; H01M 10/052; H01M 10/058;
(Continued)

(56) References Cited

U.S. PATENT DOCUMENTS 6,030,728 A    2/2000  Cotte et al.
6,048,639 A    4/2000  Sonozaki et al.
(Continued)

FOREIGN PATENT DOCUMENTS

EP    1331677    7/2003
JP    S60-86768    5/1985
(Continued)

*Primary Examiner* — Adam A Arciero
(74) *Attorney, Agent, or Firm* — McDonnell Boehnen Hulbert & Berghoff LLP

(57) ABSTRACT

The invention relates to devices incorporating thin, light-weight electrochemical cells and their method of manufacture, whereby a thin flexible pouch-type cell (1) comprises at least one pair of overlying electrode layers separated from one another by an intermediate electrolyte layer (13), the cell exterior being defined by first and second laminated sheets (3, 9) sealed together, wherein each laminated sheet (3, 9) has an outermost layer (3a, 9a) forming a respective external face of the cell (1) and a coextensive, innermost, conductive layer (3b, 9b) that acts as a current collector layer (3b, 9b) and which supports an electrode layer (5, 11), although the conductive layer may also itself act as the active electrode layer.

14 Claims, 5 Drawing Sheets

(51) Int. Cl.
*H01M 2/08* (2006.01)
*H01M 10/058* (2010.01)
*H01M 10/04* (2006.01)
*B32B 27/08* (2006.01)
*H01M 4/66* (2006.01)
*H01G 4/228* (2006.01)
*H01G 9/02* (2006.01)
*H01M 10/052* (2010.01)
*H01M 6/48* (2006.01)
*H01M 6/42* (2006.01)

(52) U.S. Cl.
CPC ......... *H01M 2/021* (2013.01); *H01M 2/0267* (2013.01); *H01M 2/0275* (2013.01); *H01M 2/0277* (2013.01); *H01M 2/0285* (2013.01); *H01M 2/08* (2013.01); *H01M 4/662* (2013.01); *H01M 4/667* (2013.01); *H01M 4/70* (2013.01); *H01M 10/044* (2013.01); *H01M 10/0436* (2013.01); *H01M 10/0486* (2013.01); *H01M 10/058* (2013.01); *H01M 2/0287* (2013.01); *H01M 4/661* (2013.01); *H01M 6/42* (2013.01); *H01M 6/48* (2013.01); *H01M 10/052* (2013.01); *Y02E 60/13* (2013.01); *Y10T 29/4911* (2015.01)

(58) Field of Classification Search
CPC .. H01M 2/021; H01M 2/0267; H01M 2/0272; H01M 2/0275; H01M 2/0277; H01M 2/0285; H01M 2/0287; H01M 2/08; H01M 4/661; H01M 4/662; H01M 4/667; H01M 4/70; H01M 6/42; H01M 6/48; Y10T 29/49108
See application file for complete search history.

(56) References Cited

U.S. PATENT DOCUMENTS

| | | | |
|---|---|---|---|
| 6,200,707 B1* | 3/2001 | Takada | H01M 4/621 |
| | | | 429/212 |
| 6,258,480 B1* | 7/2001 | Moriwaki | H01M 2/023 |
| | | | 29/623.1 |
| 2002/0106561 A1* | 8/2002 | Lee | H01M 4/5815 |
| | | | 429/218.1 |
| 2003/0017388 A1* | 1/2003 | Furusaki | H01M 2/0212 |
| | | | 429/162 |
| 2003/0049532 A1 | 3/2003 | Kurokawa et al. | |
| 2003/0059673 A1* | 3/2003 | Langan | H01M 2/0215 |
| | | | 429/127 |
| 2003/0129485 A1* | 7/2003 | Guidi | H01M 4/04 |
| | | | 429/128 |
| 2006/0115717 A1* | 6/2006 | Schubert | H01M 2/0257 |
| | | | 429/124 |
| 2006/0159999 A1* | 7/2006 | Kejha | H01M 2/1673 |
| | | | 429/254 |
| 2006/0216586 A1 | 9/2006 | Tucholski | |
| 2007/0128513 A1* | 6/2007 | Hatta | H01M 2/021 |
| | | | 429/176 |
| 2009/0246607 A1 | 10/2009 | Shinyashiki et al. | |
| 2010/0081049 A1 | 4/2010 | Holl et al. | |
| 2011/0189541 A1* | 8/2011 | Kitagawa | H01M 4/62 |
| | | | 429/217 |

FOREIGN PATENT DOCUMENTS

| | | |
|---|---|---|
| JP | H05-217587 | 8/1993 |
| JP | 2001035482 | 2/2001 |
| JP | 2001216965 | 8/2001 |
| WO | WO 20061012575 | 2/2006 |
| WO | WO 2006/102287 | 9/2006 |
| WO | WO 20091131700 | 10/2009 |
| WO | WO 20101070267 | 6/2010 |

* cited by examiner

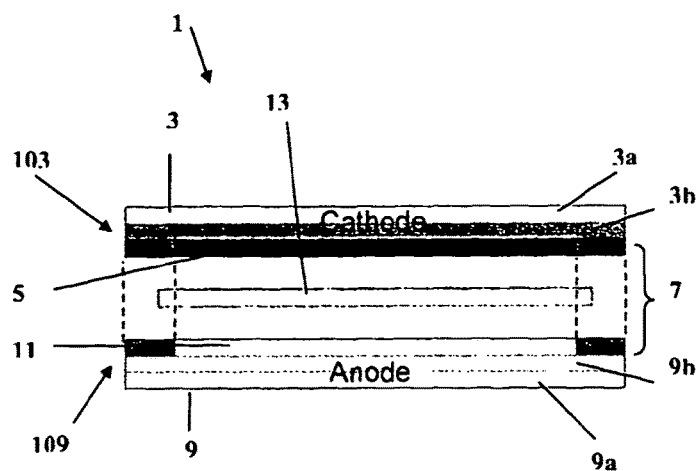
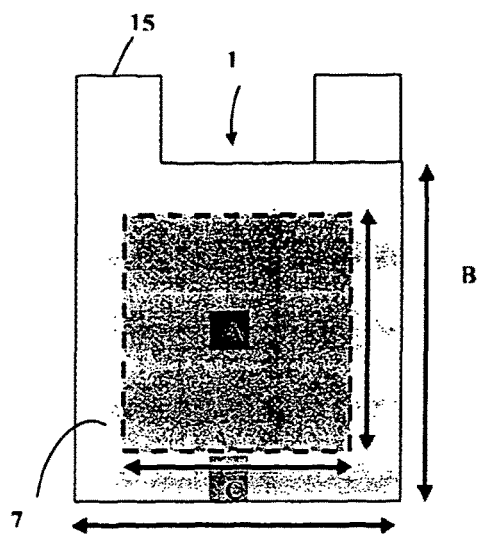
Figure 1a
Figure 1b
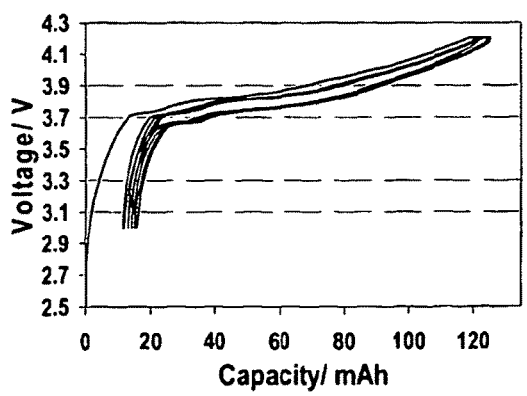
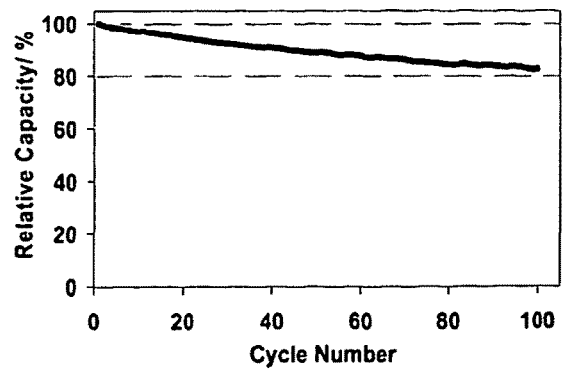
Figure 2a
Figure 2b

THIN ELECTROCHEMICAL CELL

BACKGROUND OF THE INVENTION

Field of the Invention

The present invention relates to devices incorporating thin electrochemical cells and their method of manufacture. It particularly relates to devices comprising thin, flexible cells that can be used as lightweight, versatile power sources, for example, as batteries or supercapacitors and especially those based on lithium or lithium-ion based cell chemistries.

Description of the Related Art

Conventional coin or button cells have now been replaced in many of their applications by "soft pack" or pouch cells, which are thinner and more flexible and can attain higher energy densities. Traditional lithium-ion soft pack batteries, for example, comprise active cathode and anode material coated onto aluminium and copper current collector foils, respectively. Alternating layers of these electrode materials are stacked or wound on top of one another to form the functional layers of the battery. This is then contained within an envelope of packaging laminate usually consisting of a layer of aluminium foil with a thermoplastic film bonded to the face intended to face inwards. The thermoplastic film is then heat sealed around the periphery of the cell under vacuum, its function being to hold cell components in intimate contact with one another, the aluminium foil providing an adequate moisture barrier. Especially in the case of flexible cells with few cell layers, this packaging laminate represents a significant proportion of the total mass and also reduces the flexibility of the structure.

Pouch batteries can be based on a variety of different cell chemistries, and a range of electrolyte types can be utilised. Lithium primary batteries and secondary batteries, for example, are commonly made according to a pouch design, and dry polymer, gel and liquid electrolytes have all been incorporated into pouch cells. Examples of lithium primary batteries include lithium/carbon monofluoride (LiCFx) batteries. Unlike primary lithium batteries, lithium ion secondary batteries use as anode an intercalation material (e.g. graphite), with the lithium ions cycling between the anode and cathode during charging and discharging. Examples of lithium ion rechargeable batteries include ones where the active cathode agent is a layered oxide, such as lithium cobalt oxide, ones based on a polyanion, such as lithium iron phosphate, or a spinel, such as lithium manganese oxide.

Similar design considerations apply to supercapacitors (or ultracapacitors), which are also becoming available as soft packaged cells to meet the increasing demands of the portable electronics industry. Such supercapacitors are usually based on carbon-carbon, transition metal oxide or conducting polymer chemistries and include both symmetric and asymmetric cell assemblies.

In the last few years, very thin flat cells have been developed as miniature power sources for space critical devices such as sensors, smart cards and RFID tags. For example, Front Edge Technology Inc manufactures ultra-thin lithium rechargeable batteries for card-type applications which are exceptionally thin at 0.05 mm and which can be bent or twisted without damage. Although they contain lithium, they are composed of solid-state thin films including a non-liquid, ceramic electrolyte, so that there is no risk of toxic liquid electrolyte leaking if the hermetic seal is broken.

Since 2002, Blue Spark Technologies have also developed a range of thin, flexible printed film batteries. For example, US2006/0216586 describes a thin zinc chloride based electrochemical cell in which a dielectric "picture frame" is printed around the perimeter of the active ingredients and is used to seal a top substrate to a bottom substrate so as to form an encased cell, without separate packaging being required. The substrates may be laminated film layers, while the picture frame may be formed from a UV curable adhesive; advantageously, the entire cell may be formed on a printing press. This reference is mainly concerned with arrangements in which an active anode layer and active cathode layer are built up, side by side, on the same substrate layer (co-planar design). A further arrangement in which two active electrode layers overlie one another and are built up from a lower substrate layer is also mentioned (co-facial design of FIG. 21). Where a separate current collector layer is required (the zinc anode does not require a current collector), the reference teaches that this can be applied on a portion of the inner surface of a substrate layer. Contact feed-throughs, which provide an electrical pathway from the cell interior to the exterior, need to be provided and to pass under the frame and to be appropriately sealed. Turning to the laminated film layers of the substrate, these may include a structural layer, an oxide barrier layer and a sealing layer; such layers may include metallised or foil layers to reduce water loss in the aqueous zinc chloride cell.

SUMMARY OF THE INVENTION

In a first aspect, the present invention provides a device comprising a thin, electrochemical cell comprising at least one pair of overlying electrode layers separated from one another by an intermediate electrolyte layer, the cell exterior being defined by first and second laminated sheets sealed together, wherein each laminated sheet has an outermost layer forming a respective external face of the cell and a coextensive innermost, conductive layer that acts as a current collector layer and which either supports an electrode layer or also acts as the active electrode layer.

Preferably, the invention provides a device comprising a thin, electrochemical cell comprising at least one pair of overlying electrode layers separated from one another by an intermediate electrolyte layer, the cell exterior being defined by first and second laminated sheets sealed together, wherein each laminated sheet has an outermost layer forming a respective external face of the cell and an innermost, coextensive conductive layer that acts as a current collector layer and which supports an electrode layer.

Contrary to prior art arrangements where current collecting layers are subsequently applied to only selected portions of a substrate, the present inventors have found that it is possible to use as cell packaging a laminated sheet comprising a protective layer on one face, and a coterminous conductive layer on the other face that acts as a current collecting layer. The current collector layer inherently provides external electrical connectivity in that itself extends to the edge of the cell, thereby allowing current easily to be removed from the cell; this is in contrast to prior art arrangements where electrical feed-throughs of some form need to extend through cell packaging/cell borders and into an inner active cell area. By reducing cell weights, such a novel construction allows thin cells with very high energy densities to be achieved. Also, by obviating the need for laying down of separate current collecting layers or feed-through connectors, manufacturing complexity and costs can be minimised.

US2006/0216586 does not contemplate anywhere the possibility of using the entire inner face of a laminated sheet as a current collector. Rather it consistently teaches throughout that a current collecting layer, where required, should be laid down upon a portion of the laminated sheet despite the additional weight this creates and the need for an additional external connectivity. Moreover, US2006/0216586 recognises that the laminated sheet may include metallised films or foil layers, but only mentions their benefits in terms of reducing moisture loss in the aqueous zinc chloride cells. Indeed, it teaches away from such constructions in that it states that laminated structures with metal layers have the possibility of causing internal shorts. Despite the perceived risk that a laminated sheet with an integral current collecting layer might cause shorts, for example, at the edge of the cell, it has been found that the present cell construction can be manufactured into robust thin cells, and even into cells that can withstand repeating flexing.

The electrolyte layer in any cell separates a pair of positive and negative electrodes from contacting one another and comprises the electrolyte that interacts with the electrodes to create an electric current. The electrolyte layer in the present cell may comprise a dry polymer electrolyte or a polymer gel electrolyte and may itself act as the separator. Alternatively, the electrolyte layer may comprise a semi-permeable or porous membrane acting as separator which is soaked with a small amount of liquid electrolyte. Such a semi-permeable membrane may, for example, be a tri-layer polymer laminate. The use of porous separators with liquid electrolyte are preferred for lithium-ion batteries to achieve high charging and discharging rates. Such liquid electrolytes usually consist of a lithium salt, for example, $LiBF_4$, $LiPF_6$ or $LiClO_4$, in an organic solvent, such as an organic carbonate.

Since the current collector layers of the laminated sheets necessarily extend to the cell periphery, where those layers are of opposite polarity, they must be kept electrically isolated from one another. The electrolyte layer may extend to the cell periphery to achieve this. For example, an electrolyte layer may be provided that is also capable of acting as an adhesive and that can form a seal with an adjacent laminated sheet. For example, polymer gel electrolytes are known and available that under heat and compression will sealingly bind to a laminated sheet. A pair of laminated sheets laid up as cell halves could therefore be calendared together with a polymer gel electrolyte to from a sealed cell.

It may be desirable to provide a tape or resin seal around the entire perimeter edge of the cell, preferably also partly folded over the cell faces as a border, to seal and protect the edges of the layers that form the cell. This may protect any exposed current collector edges or electrolyte layer edges, particularly in the case where the electrolyte layer also performs the adhesive/cell sealing function.

Usually, however, it will be preferable for the first and second laminated sheets to be sealed together around the cell periphery by at least one frame or border disposed within the cell, to provide a more robust cell and act as a moisture barrier. The current collector layer will usually have a continuous bare border, i.e. without any active electrode material, upon which the frame is built up, thereby surrounding a smaller, central, active electrode area. Since the frame reduces the active cell area, and is itself "dead weight", its dimensions should therefore be minimised to those necessary for it to perform these stated functions.

The laminated sheets will usually have current collecting layers of opposite polarity (e.g. in a one electrode pair cell) and will need to be sealed together in an "insulated manner", whereby the conductive layers of the sheets are kept electrically isolated from one another. The frame may directly adhere one current collecting layer to the other such layer, or there may be other layers (e.g. separator layers, or additional electrode/current collecting layers) also interposed between the two laminated sheets. In the former case, the frame would need to be inherently insulating (e.g. a polymeric adhesive frame), while in the latter case either the frame or an interposed layer may act as insulation.

The border will usually extend continuously around the entire periphery of the cell to hold the cell together and to seal and confine the active cell area, especially in the case of a liquid electrolyte, but it may be interrupted by other components providing the sealing and insulation of the cell is maintained.

The frame (s) may conveniently be formed from a thermoplastic stencil, or an adhesive frame, which adhesive is preferably printed. Printable adhesives are known and available. The one or more frames may however be built up from any materials or combination of materials that will bond the laminated sheets, seal and, where necessary, insulate the interior of the cell where the active components and electrolyte is located. The frame could therefore be produced from one or more borders/frames of polymeric material sealed in place by a suitable adhesive, such as a contact adhesive. Where the cell is built up in stages with a series of electrode pairs and separator sheets, a new frame/border, e.g. of adhesive, may need to be applied at each stage around the perimeter of the cell on top of the existing frame/border.

The first and/or second laminated sheet will conveniently be shaped or cut with an integrally formed extending tab to provide external electrical connectivity to the cell. Tabs of opposing polarity may be located on the same edge of the cell but spaced from one another, or located on opposite edges of the cell.

The term "laminated sheet" is used broadly to cover an arrangement where layers are laminated together or otherwise attached together or built up on top of each other to form a final sheet product. In addition to the current collection function, the laminate needs to provide a moisture barrier and a protective function. The conductive layer may provide the only moisture barrier protection or other moisture barrier layers may be provided to prevent moisture loss (e.g. from aqueous batteries) or ingress (e.g. non-aqueous batteries). In a preferred embodiment, two current collecting layers are sealed together at their (uncoated) peripheries by means of a frame, all of which are moisture proof, to form a moisture proof 3D barrier encasing the active cell area.

Depending on the cell chemistry selected, the electrically conductive layer may comprise a foil layer, a deposited or sprayed metallic layer or a printed metallic ink layer or any other non-porous, highly conductive material layer that is electrochemically stable in the chosen cell environment. It may be formed from copper, zinc, aluminium, platinum, silver or gold.

In the case of lithium-ion batteries, due to their sensitivity to water, an extremely efficient moisture barrier layer is required and the only materials capable of providing the required moisture permeation levels (lower than $1.10^{-3}$ $g/m^2/day$) are metal layers. In a lithium ion cell, possible metals that are electrochemically stable on the respective sides are: Cathode side: Al, Au, Pt, Pd, Ti; Anode side: Cu, Fe, Cr, Ni, Mo. Typically with lithium ion chemistries an aluminium foil is used for cathode laminates and a copper foil for the anode laminates. The foils need to be thick enough to provide an adequate moisture barrier over the lifetime of the cell. Those skilled in the art will understand that optimum foil thickness will depend on the required service lifetime of the battery, with thinner laminates providing the best energy density, but with the trade off of lower shelf lives. Similarly thickness of the polymer film and any adhesive layers is a trade off between energy density and resistance to mechanical damage.

The first and/or second laminated sheet may be a composite metal laminate, for example, a bonded foil laminate or a vacuum coated laminate. Bonded foil laminates are formed from one or more metal foils bonded to a polymer film using a suitable adhesive film; they are already used in flexible circuitry and have adequate barrier performance and conductivity, but can be less flexible than vacuum deposited laminates, although such rigidity may secure additional protection to a battery for some applications.

Vacuum deposited laminates tend to be lighter and more flexible, but more expensive and need careful manufacture to provide adequate barrier performance and conductivity. Alternating layers of a metallic layer and a spacer layer (comprising one or more dielectric layers) each termed a dyad pair, for example, metal and polymer layers, are deposited onto a polymer film substrate. The principle is that the inherent porosity of any layer deposited by this process will be overcoated by the subsequent dyad layer. Each layer is typically very thin (in the order of 30-50 nanometers) and this thickness of metal would not provide suitable conductivity for a current collector. Therefore the metal layer of the final dyad pair is laid down in multiple passes to build the thickness up to a level that would provide suitable conductivity (in the order of 0.3-1.5 micrometers). Thus, in that case, the conductive layer is provided by an outermost metallic sub-layer of increased thickness relative to the remaining metal sub-layers of the vacuum deposited laminate.

A suitable vacuum deposited laminate would normally have a thickness range of 12 to 125 microns (this thickness being made up almost entirely of the polymer film substrate thickness chosen). Bonded foil laminates are likely to have a total thickness range of 50 to 230 microns depending on the laminate structure chosen. Typically the metal foil layer will be between 9 and 50 microns, the polymer layer between 12 and 125 microns. The laminate will usually have a mass per unit area of between 100-400 $g/m^2$, or even 100-200 $g/m^2$ where less barrier performance is required.

The first and/or second laminated sheet may consist only of an outermost polymeric layer and an innermost conductive layer, for example, a bonded foil laminate with only a single foil layer. A preferred outermost protective layer for a bonded foil laminate is a polyimide, polyethylenenaphalate (PEN), or polyester layer.

The present cell construction is suitable for batteries or supercapacitors where a current collector layer acts as the electrode layer or, as is more common, supports the electrode layers. For example, the cell may be a non-aqueous, secondary, lithium-ion based battery, where both anodes and cathodes usually require current collector layers, or a lithium primary battery, for example, $LiCF_x$, or $LiMnO_2$ or $LiFeS_2$, where a lithium anode may be supported on a copper current collecting layer and a cathode layer supported on an aluminium cathode current collector.

In a lithium ion based cell using a bonded foil laminate, a preferred cathode collecting laminated sheet is laminated plastics (e.g. polyimide)/aluminium foil, while a preferred anode collecting laminated sheet is laminated plastics (e.g. polyimide)/copper foil.

The cell may comprise only a single anode layer and a single cathode layer, one being provided on the innermost conductive layer of the first laminated sheet and the other being provided on the innermost conductive layer of the second laminated sheet. This will yield the thinnest cell construction and involve the laminated packaging acting as the respective negative and positive current collectors.

Alternatively, one or more additional, inwardly disposed pairs of electrode layers may be provided for greater energy storage; these may have respective external electrical connections extending out through the cell periphery, for example, through an adhesive frame, if present. Such cells may be suitable for applications with less stringent flexibility or thickness requirements. The inwardly disposed electrode layers may be supported on conductive substrate layers acting as current collectors. These additional current collector layers may either have integral or separate projecting tabs to provide external electrical connectivity for the cell, or, similarly to the current collector layers of the laminated sheets, they may extend to the cell edge provided that they are sealed together in an insulated manner (e.g. sealingly sandwiched between pairs of insulating frames). These electrode layers may be applied as single-sided layers to the substrate layers, but are advantageously applied as double-sided layers to a fully conductive (e.g. a foil) substrate layer; the cell interior may have double-sided anode current collectors alternating with double-sided cathode current collectors. Providing that the numbers of electrodes and active amounts of anode and cathode material are appropriately balanced, it could be that both of the innermost conductive layers of the two laminated sheets end up as anode current collectors or both end up as cathode current collectors, it being desirable to minimise the numbers of whichever is the more dense of the current collecting, conductive substrate layers. The invention, however, is primarily applicable to cells with only one or two electrode pairs; it will usually be more efficient to use a normal soft pack arrangement for thicker cells.

The device may comprise a plurality of cells, wherein the cells are formed as an array of connected cells that share common first and second laminated sheets, with the respective frames forming an interconnected grid of grid-lines delineating the respective cells. While the cells may already have some flexibility, the grid-lines will allow the device much more flexibility.

The present invention in a further aspect comprises the use of a laminated sheet in a thin electrochemical cell to provide both an outer protective surface and an inner current collecting surface for the cell, and especially to the use of a pair of such sheets sealed together, optionally by means of a frame, to define the cell exterior.

The present invention further provides a method of manufacturing a device comprising a thin, electrochemical cell comprising at least one pair of overlying electrode layers separated from one another by an intermediate electrolyte layer, the method comprising:— providing first and second laminated sheets, wherein each sheet has an outermost layer intended to form a respective external face of the cell and a coextensive innermost conductive layer intended to act as a current collector layer and either to support an electrode layer or also act as the active electrode layer;

applying electrode layers, where these are required, to respective portions of the respective conductive layers, which portions will become the active cell area;

assembling in an overlying arrangement the laminated sheets, any optional additional electrode layers, and appropriate intermediate electrolyte layers interposed between electrode layers of opposite polarity; and, sealing the first and second laminated sheets together around the cell periphery to form the cell exterior.

Preferably, the invention provides a method of manufacturing a device comprising a thin, electrochemical cell comprising at least one pair of overlying electrode layers separated from one another by an intermediate electrolyte layer, the method comprising:— providing first and second laminated sheets, wherein each sheet has an outermost layer intended to form a respective external face of the cell and a coextensive innermost conductive layer intended to act as a current collector layer and to support an electrode layer;

applying electrode layers to respective portions of the respective conductive layers, which portions will become the active cell area;

assembling in an overlying arrangement the laminated sheets, any optional additional electrode layers, and appropriate intermediate electrolyte layers interposed between electrode layers of opposite polarity; and, sealing the first and second laminated sheets together around the cell periphery to form the cell exterior.

Usually, the first and second laminated sheets are sealed together to form the cell exterior using a frame disposed within the cell around the cell periphery.

The present invention additionally provides any novel feature or novel combination of features hereinbefore mentioned.

BRIEF DESCRIPTION OF THE DRAWINGS

Preferred embodiments of the present invention will now be described, by way of example only, with reference to the accompanying drawings in which:—

FIGS. 1a and 1b are, respectively, an exploded cross-sectional view and a plan view of a bonded foil laminate cell according to a first preferred embodiment of the invention;

FIG. 2a is a charge/discharge plot and FIG. 2b is a cycle life plot for the cell of FIG. 1;

DETAILED DESCRIPTION OF PREFERRED EMBODIMENTS

Figure 3:
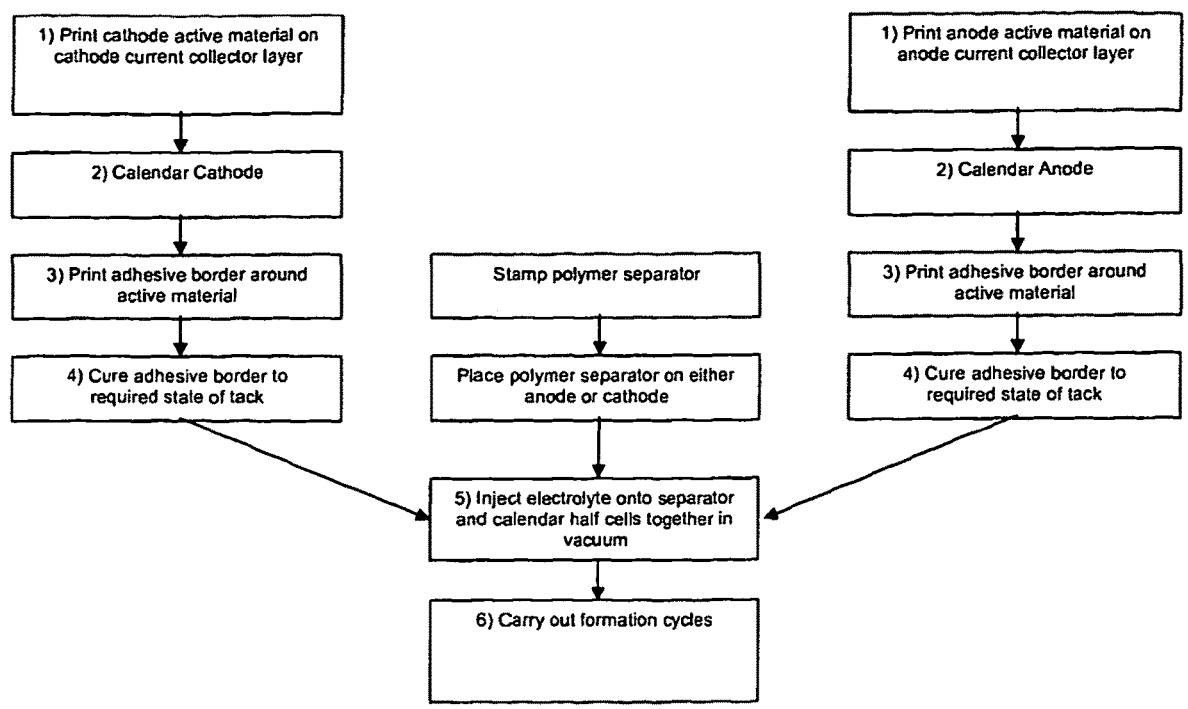
FIG. 3 is a flow chart illustrating the steps for manufacturing the cell of FIG. 1.

A bonded foil laminate, thin electrochemical cell, according to a first embodiment of the invention, for use as a lightweight battery for handheld equipment is shown in FIG. 1b in plan view.

Referring to FIG. 1a, the cell 1 comprises an upper laminated sheet 3 formed of an outermost polyimide layer 3a bonded to an innermost conductive layer 3b of aluminium foil, which layer forms the cathode current collecting layer 3b. Deposited upon the conductive layer 3b is a central square of cathode active material 5, which becomes the active cell area A and is surrounded by a closed adhesive frame 7. Similarly, the lower laminated sheet 9 is formed of an outermost polyimide layer 9a bonded to an innermost conductive layer 9b of copper foil, which layer forms the anode current collecting layer 9b. Deposited upon the conductive layer 9b is a central square of anode active material 11, surrounded by an adhesive frame 7, as seen in FIG. 1b. A polymer separator 13 soaked in electrolyte is disposed between the cathode half cell 103 and anode half cell 109 with its edges sandwiched between the two adhesive frames 7.

Each laminated sheet 3, 9 has been cut so that it is formed with an integral extending tab 15 of polyimide layer/conductive layer laminate. When assembled, the tabs are on the same cell edge but are spaced from one another to act as the respective battery terminals.

Materials and Methods
Cell Chemistry

Lithium-ion battery technology was chosen for this application as it offers the highest energy density of any rechargeable battery system that is currently available on the market. The chemistry requires a structure such that anode and cathode are separated by a porous separator, which is saturated with liquid electrolyte to enable transportation of charge between anode and cathode so that the cell can generate an electrical current.

In this preferred embodiment, all the components are printable to allow roll to roll production methods. The cathode ink comprises a lithium cobalt oxide, carbon black as conductive additive, a co-polymer of polyvinyledene fluoride (PVDF) as the binder and n-methylpyrolidinone as the solvent. The anode ink consists of potato graphite and a co-polymer of polyvinyledene fluoride (PVDF) as the binder. The liquid electrolyte consists of lithium hexafluorophosphate ($LiPF_6$) in a solution of a mixture of ethylene carbonate (EC) and ethyl methyl carbonate (EMC).

A screen printable, UV curable, pressure sensitive adhesive from 3M was employed that could be patterned by screen printing as borders to form the frame 7. The selected adhesive can be UV cured to the optimum level of tack, prior to bonding using pressure. The advantage of a UV cured adhesive over a traditional solvent contact adhesive is that the correct level of tack can be maintained during heat drying in an oven prior to bonding in dry room conditions, allowing the half cell 103, 109 structure to be fabricated outside of the dry room.

Turning to the electrolyte layer, an electrically insulating, porous separator layer 13 is provided between the printed anode and cathode material. It has to prevent the anode and cathode from electrically shorting and also store the liquid electrolyte that allows lithium ion transport between the electrodes. A commercially available extruded polymer film typically used in soft pack cells was used as separator 13, cut to the active cell shapes. (Alternatively, a porous PVDF membrane separator layer could be applied by spraying a co-solvent mixture through a mask over the patterned anode and cathode structures.) As the current collectors of the structure extend across the entire cross-section of the cell 1 (coextensive with the polyimide layer) including the areas where there is no active anode and cathode material 5, 11 or separator 13, the rest of their surfaces must be insulated to prevent electrical shorting of the two half cells. The selected contact adhesive frame 7 was able to provide an adequate insulating barrier. However, it is advisable to ensure that the porous separator 13 extends a few mm beyond the active cell area A in all directions, in case of possible misalignment of the half cells 103,109 and also to allow it to be held in place by the contact adhesive during cell assembly.

Referring to FIG. 3 there is shown a flow chart illustrating the steps of a preferred process for manufacturing this single electrode pair cell. As indicated above, all materials chosen for construction were chosen to ensure web to web printing is possible, except for the separator (which could be sprayed on web processing equipment if the co-solvent mixture was chosen). Firstly, each active electrode material is printed on the appropriate conductive layer of the respective laminated sheet in the pattern of the active cell area A. Each electrode is then calendared, that is to say, fed between two steel rollers in order to compact the active material and increase its bulk conductivity and improve the interfacial resistance to electrolyte. The adhesive border is then printed around the active electrode area. Then the adhesive is cured to the required state of tack. Meanwhile, a polymer separator has been stamped to the correct shape (slightly larger than the active area) and is carefully placed over one electrode. Electrolyte is then injected onto the separator and the half cells are calendared together under vacuum to seal the cell. Formation cycles are then carried out to activate the cell.

The square cell has a side length B of 115 mm, an active area of side length C 80 mm and is 300 microns thick. It has a total weight of 6.3 g. In this prototype, the cathode and anode laminated sheets used had a thickness of 75 and 80 microns respectively, with the respective thicknesses of the polyimide layer, Al foil layer and Cu foil layer being 50, 12 and 9 microns, respectively (in addition to an adhesive layer of ~15-20 microns). Referring to FIG. 2a, there is shown a charge/discharge plot and in FIG. 2b a cycle life plot for the lithium ion cell. The theoretical capacity of this cell based on cathode cell mass was 112 mAh and actual performance after formation was 110 mAh. Cells cycled at C/2 in the range of 3.0-4.2V showed a drop of relative capacity of 18% after 100 cycles, which is comparable to commercially available soft pack cells. The energy density was 64.6 mWh/g (capacity (mAh)×av. voltage (3.7V) divided by cell mass). However another way to express this for such thin cells is energy per unit area which was 3 mWh/cm$^2$.

The cell was also flex tested using rolling flex method around bend radii as tight as 5 mm without noticeable deterioration in function. Such cells have also been shown to be resistant to acetone cleaning.

In a second embodiment, a multi-compartment, bonded foil laminate cell 21 was made that was designed to withstand more rigorous flexing. The cell has the same cross-sectional structure and thickness as the cell of FIG. 1 and was made by the same method, except that each laminated sheet 29, 31 supports a number of adjacent half cells.

Figure 4:
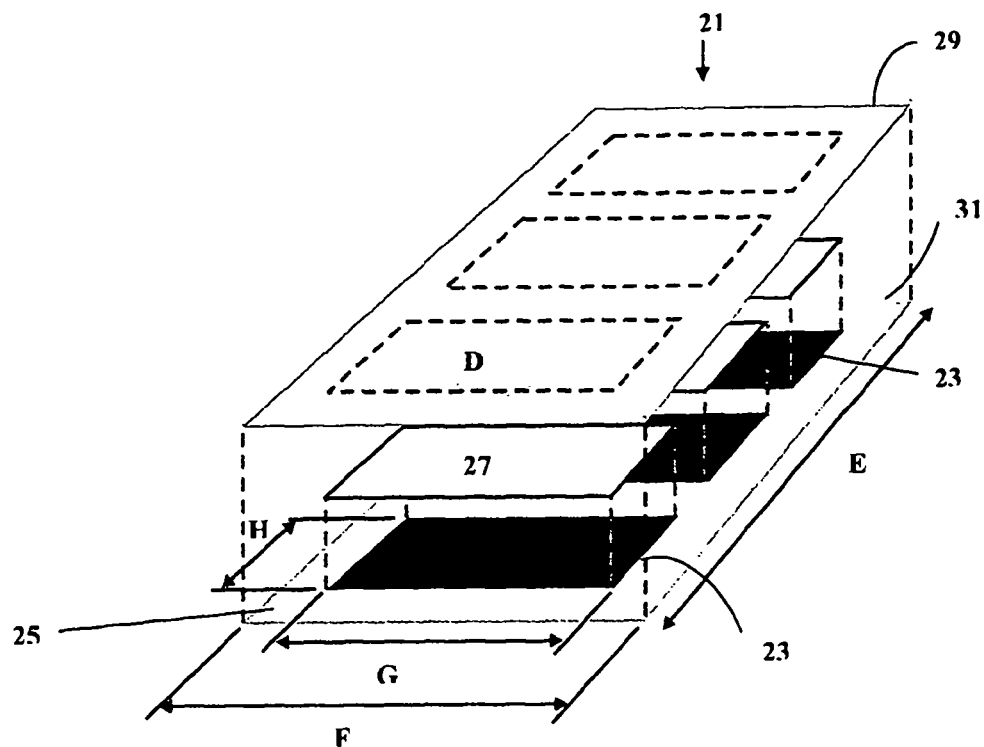
FIG. 4 is an exploded perspective view of a multi-compartment, bonded foil laminate cell similar to that of FIG. 1, according to a second embodiment of the invention.

In this case, the active area was split into three discrete compartments 23 with adhesive frames 25 printed in between, as shown at the bottom of FIG. 4. Three porous separators 27 were placed in position, again slightly overlapping (not shown) the cell active areas D. Once again, all patterning of the cell electrodes and adhesive was accomplished by printing.

Figures 5A, 5B:
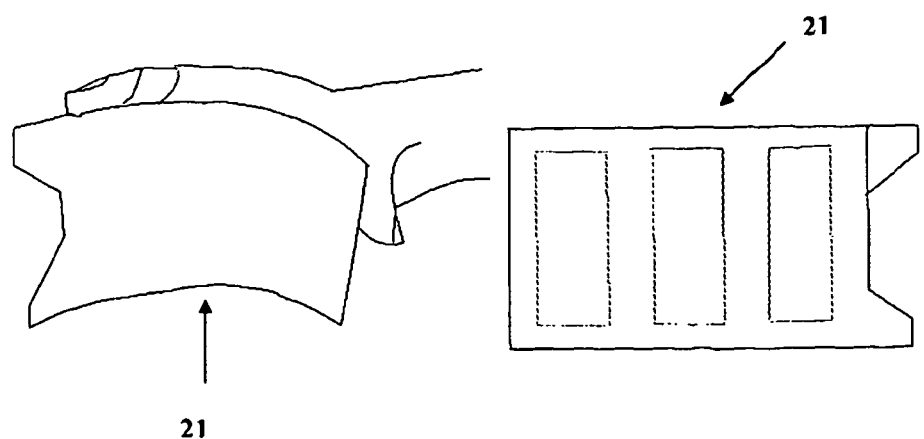
FIGS. 5a and 5b are, respectively, a perspective schematic view of the multi-compartment cell of FIG. 4 being flexed and a plan view of the unflexed cell.

The overall cell had side lengths of E 206 mm and F 140 mm, with the active areas having side lengths of G 104 mm by H 42.7 mm. FIGS. 5b and 5a schematically depict the final cell 21 when flat and when flexed, respectively.

The aim of the compartmentalisation was to improve the endurance of the cell when flexed repeatedly and this was shown to be successful. A sample (having an initial capacity of 200 mAh) was tested around a bend diameter of 60 mm for 5 cycles. After testing the capacity remained at 200 mAh. If breathability is required, it is possible to perforate the grid-line areas with an array of holes.

In addition the performance attained was 320 mAh and the cells weighed 61-17 g. Expected capacity for this cell was 333 mAh.

Figure 6:
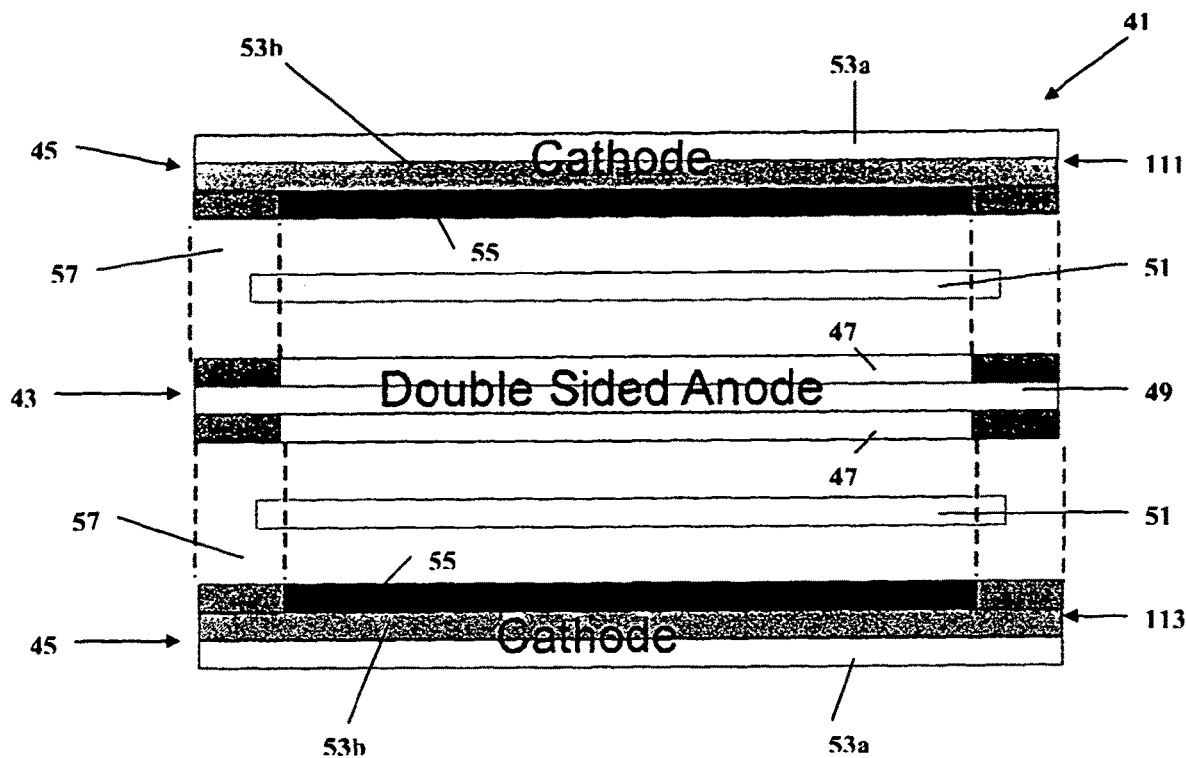
FIG. 6 is an exploded cross-sectional view of a bonded foil laminate cell with an internal double-sided anode according to a third embodiment of the invention.

In accordance with a third embodiment, a bonded foil laminate cell 41 may be fabricated with additional electrode layers for greater capacity. For example, FIG. 6 shows a possible structure for such a cell where there is an internal double-sided anode 43 and two outer cathodes 45, with porous separator layers 51 sandwiched in between, and sealed by an adhesive frame 57. In this case, a double-sided anode 43 could be provided by depositing active anode material 47 on both sides of a standard copper foil layer 49. (Copper is more dense than aluminium and hence this arrangement minimises the total ratio of copper to aluminium in the cell.) External electrical connectivity may be provided by extending the copper foil outside the border using a tab shape, although this would ideally be reinforced by a polymer layer bonded over one side of the tab after cell fabrication.

Each sheet 111, 113 comprises an outermost polyimide layer 53a and an innermost conductive aluminium foil layer 53b, upon which the active cathode material 55 would be printed. Electrically, there are two respective anode/cathode pairs in the cell, although both the laminated sheets 111, 113 in this particular, symmetrical arrangement act as cathode current collector layers. The disadvantage of this arrangement would be reduced flexibility and increased thickness.

Figure 7:
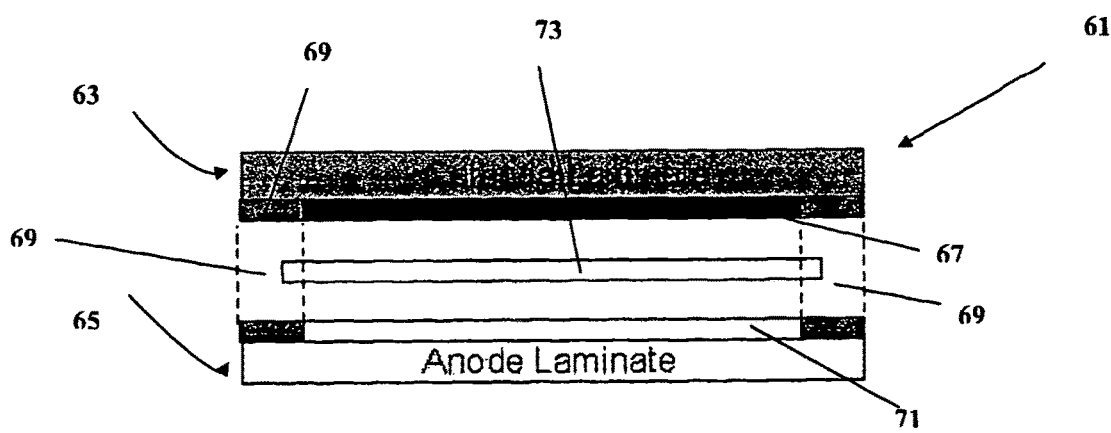
FIG. 7 is an exploded cross-sectional view of a vacuum deposited laminate cell according to a fourth embodiment of the invention; and, FIG. 8 is an exploded cross-sectional view of a bonded foil laminate cell according to a fourth embodiment of the invention.

Finally, FIG. 7 depicts a vacuum deposited laminate cell 61 as a further embodiment with a different laminate construction. The cell comprises a cathode laminate 63 printed with cathode active material 67 and an adhesive border 69 forming the cathode half cell, and an anode laminate 65 printed with anode active material 71 and an adhesive border 69 forming the cathode half cell. As before, a polymer separator 73 is sandwiched between the two half cells to provide the electrolyte layer. Such a cell would still have a coterminous innermost conductive layer and outermost layer but would also have additional vacuum deposited layers inside the cathode and anode laminates. Examples of possible layer structures for the anode and cathode laminates 65, 63 are given in Tables 1 and 2 below.

TABLE 1

| Layer structure of anode laminate | |
| --- | --- |
| Thick Copper | 0.3 µm |
| High temperature polymer | 30-50 nm |
| Copper | 30-50 nm |
| High temperature polymer | 30-50 nm |
| Copper | 30-50 nm |
| Polyimide substrate | 50 µm |

TABLE 2

| Layer structure of cathode laminate | |
| --- | --- |
| Thick Aluminium | 1.5 µm |
| High temperature polymer | 30-50 nm |
| Aluminium | 30-50 nm |
| High temperature polymer | 30-50 nm |
| Aluminium | 30-50 nm |
| Polyimide substrate | 50 µm |

The thicknesses and particular choice of layers and number of respective layers in the sheet will of course depend on the flexibility, robustness and energy densities required in the final device. Bonded foil laminates typically have mass per unit area of 300-400 g/m$^2$, while vacuum coated laminates typically have mass per unit area of 100-200 g/m$^2$ and are more flexible, but are more expensive and likely to have less good barrier performance. The particular composition vacuum deposited laminate of Tables 1 & 2 was manufactured as a prototype and found to have increased flexibility over the bonded foil laminate. In this particular prototype the barrier performance was insufficient, but variants with greater sub-layer thicknesses or more sub-layers would be capable of achieving adequate barrier performance and electrical performance.

Example

An example of a possible cell 81 with one laminated sheet having a coextensive, innermost, conductive layer that acts as a current collector layer and that also acts as the active electrode layer will now be described, by way of example.

Figure 8:
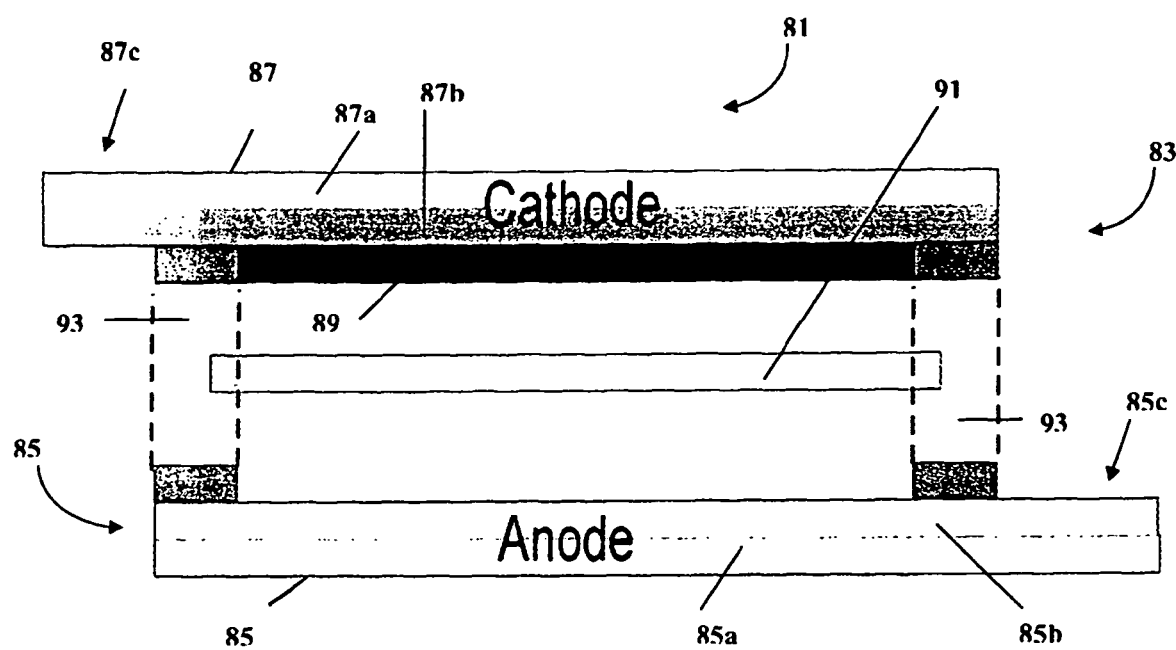

A primary zinc carbon cell 81 could be formed using a bonded foil laminate structure as depicted in FIG. 8.

The cathode half cell 83 could be formed in a similar manner to that of FIG. 1 with a bonded foil laminate 87 comprising an outer polymer layer 87a bonded to an aluminium foil inner layer 87b, onto which is deposited the active cathode material 89. In this example, carbon and manganese dioxide would be used in the form of fine particulates dispersed into a polymer/solvent vehicle that allows it to be deposited by printing methods into the required pattern. The combination of active particulate and vehicle is typically known as an ink or paste.

The anode laminate 85 comprises a zinc foil layer 85b bonded to a coextensive polymer layer 85a. As the zinc itself is acting as the active anode material, as well as current collector and moisture barrier, no active material need be deposited on this laminate. Both laminates 87,85 are cut into such a shape that a tab 87c, 85c extends outside of the cell compartment to act as a point at which electrical current can be drawn out of the battery.

The laminates 87, 85 are bonded together in an overlying face to face arrangement with a suitable electrolyte layer 91 interposed between them. As shown in FIG. 8, an adhesive frame 93 could be printed around the outside edge of the active cell area (defined by the cathode only) and a paper based separator layer 91 positioned so it slightly overlaps the area defined by the active cathode material in order to prevent shorts. The electrolyte could contain an aqueous mixture of a zinc salt, for example, an ammonium chloride/zinc chloride mixed salt.

A further chemistry that could be used in this embodiment is zinc/copper where by no active materials would need to be deposited at all. The copper would be contained in a copper/polymer laminate of the cathode and the zinc in a zinc polymer laminate of the anode.

In summary, the present invention is concerned with thin cells with overlying electrode layers in face-to-face arrangements. Such thin cells already have low internal cell resistances and allow high currents and capacities to be achieved, but the present invention provides a further significant weight reduction allowing even higher energy densities to be attained, especially in lithium ion based cell chemistries. The present thin cells may have a total cell thickness of 200-1000 microns, but more usually 250-400 microns.

It will be appreciated that various modifications could be made to the cell structures described above, still in keeping with the present invention and that although the above examples are based on lithium ion chemistry other suitable cell chemistries could also be used. Similarly to thin batteries, supercapacitors requiring electrode layers supported by current collectors could also be manufactured in accordance with the present invention.

The invention claimed is:

1. A method of manufacturing a device comprising a thin, electrochemical cell with a total cell thickness of 200-1000 microns comprising at least one pair of overlying first and second electrode layers separated from one another by an intermediate electrolyte layer, the method comprising:
   providing first and second laminated sheets, wherein each respective laminated sheet consists only of an outermost polymeric layer forming a respective external face of the cell and a coextensive innermost conductive layer acting as a current collector layer and wherein the first laminated sheet conductive layer supports an electrode layer or also acts as the active electrode layer and wherein the second laminated sheet conductive layer is an active electrode layer wherein the second laminated sheet conductive layer is a foil layer, a deposited metallic layer, a sprayed metallic layer or a printed metallic ink layer and wherein the first and/or second laminated sheet has an integrally formed extending tab to provide external electrical conductivity;
   calendaring each electrode;
   sealing the first and second laminated sheets together around the cell periphery to form the cell exterior; and
   flex testing the electrochemical cell with a bend diameter of 60 millimeters.

2. The method of manufacturing a device as claimed in claim 1, wherein the first laminated sheet has an outermost layer intended to form an external face of the cell and a coextensive innermost conductive layer intended to act as a current collector layer and to support an electrode layer; and the method comprises:
   applying an electrode layer to the first laminated sheet conductive layer, which will become the active cell area.

3. The method as claimed in claim 2, wherein the first and second laminated sheets are sealed together to form the cell exterior using a frame disposed within the cell around the cell periphery.

4. The method of claim 1 wherein the innermost conductive layer of the first laminated sheet is not said active electrode layer, and wherein the method further comprises:
   applying an electrode to the innermost conductive layer, which will become the active cell area and act as the active electrode layer.

5. A device comprising:
   a plurality of thin, electrochemical cells with a thickness of 200-1000 microns comprising overlying first and second electrode layers separated from one another by an intermediate electrolyte layer, the cell exteriors being defined by first and second laminated sheets sealed together, wherein one laminated sheet has an outermost layer forming a respective external face of the cells and a coextensive innermost, conductive layer that acts as a current collector layer wherein the second laminated sheet consists only of two layers; an outermost polymeric layer and a coextensive innermost conductive layer that is the second active electrode layer wherein the second laminated sheet conductive layer is a foil layer, a deposited metallic layer, a sprayed metallic layer or a printed metallic ink layer, and wherein the first and/or second laminated sheet has an integrally formed extending tab to provide external electrical conductivity, wherein the cells are formed as an array of connected cells that share common first and second laminated sheets, wherein the first and second laminated sheets are sealed together around respective cell peripheries by means of at least one frame disposed within the cells, whereby the respective frames form an interconnected grid of grid-lines delineating the respective cells, wherein the grid-lines are perforated with an array of holes.

6. The device as claimed in claim 5, wherein the at least one frame is formed from a thermoplastic stencil, or is an adhesive frame.

7. The device as claimed in claim 5, wherein at least one cell comprises only a single anode and a single cathode.

8. The device as claimed in claim 5, wherein the first and/or second laminated sheet is a bonded foil laminate or a vacuum coated laminate.

9. The device as claimed in claim 5, wherein at least one cell is a non-aqueous, lithium or lithium-ion based battery or supercapacitor.

10. The device as claimed in claim 5, wherein the device is capable of flexing along the grid-lines.

11. The device of claim 5 wherein the outermost polymeric layer is a polyimide layer.

12. The device of claim 5 wherein the electrochemical cells have a thickness of from 250-400 microns.

13. The device of claim 5 wherein the second active electrode layer is the anode.

14. A device consisting essentially of a thin, electrochemical cell with a thickness of 200-1000 microns comprising first and second laminated sheets separated from one another by an intermediate electrolyte layer, and sealed together, wherein the first laminated sheet has an outermost layer forming a respective external face of the cell and a coextensive innermost, conductive layer that acts as a current collector layer and having an active cathode material applied to the innermost conductive layer of the first laminated sheet and wherein the second laminated sheet consists only of an outermost polymeric layer and a coextensive innermost conductive zinc foil layer such that the zinc foil layer is an active anode material and wherein the first and/or second laminated sheet has an integrally formed extending tab to provide external electrical conductivity, wherein the first and second laminated sheets are sealed together around the cell periphery by means of at least one frame disposed within the cell, whereby the at least one frame forms an interconnected grid of grid-lines delineating the cell, wherein the grid-lines are perforated with an array of holes.

* * * * *